(12) United States Patent
Rogers et al.

(10) Patent No.: US 10,648,584 B2
(45) Date of Patent: May 12, 2020

(54) EARTHQUAKE GAS VALVE (71) Applicants: Vincent Rogers, San Rafael, CA (US); Kenneth Tarlow, San Rafael, CA (US)

(72) Inventors: Vincent Rogers, San Rafael, CA (US); Kenneth Tarlow, San Rafael, CA (US)

(*) Notice: Subject to any disclaimer, the term of this patent is extended or adjusted under 35 U.S.C. 154(b) by 0 days.

(21) Appl. No.: 15/977,504

(22) Filed: May 11, 2018

(65) Prior Publication Data

US 2018/0335159 A1    Nov. 22, 2018

Related U.S. Application Data (60) Provisional application No. 62/603,179, filed on May 19, 2017.

(51) Int. Cl.
F16K 17/36 (2006.01)
F16K 31/54 (2006.01)

(52) U.S. Cl.
CPC ............ F16K 17/363 (2013.01); F16K 31/54 (2013.01); *Y10T 137/1987* (2015.04)

(58) Field of Classification Search
CPC ...... F16K 17/363; F16K 17/36; F16K 17/366; F16K 17/386; F16K 17/38; F16K 31/54; F16K 31/535; F16K 31/53; Y10T 137/1987; Y10T 137/1963; Y10T 137/1939; Y10T 137/1915; Y10T 137/0753; Y10T 137/0777
See application file for complete search history.

(56) References Cited

U.S. PATENT DOCUMENTS

| | | | | |
|---|---|---|---|---|
| 2,995,337 A | * | 8/1961 | Tanner | F16K 3/243 251/250 |
| 3,084,904 A | * | 4/1963 | McGay | F16K 1/2028 251/218 |
| 3,228,651 A | * | 1/1966 | Egashira | F16K 1/2007 251/122 |
| 3,286,980 A | * | 11/1966 | Marshall | F16K 3/06 251/302 |
| 3,783,887 A | * | 1/1974 | Shoji | F16K 17/363 137/38 |
| 4,098,284 A | * | 7/1978 | Yamada | F16K 17/36 137/39 |
| 4,207,912 A | * | 6/1980 | Ichikawa | F16K 17/36 137/39 |
| 4,522,225 A | * | 6/1985 | Llauge | B60H 1/00485 137/351 |
| 4,785,842 A | * | 11/1988 | Johnson, Jr. | F16K 17/36 137/38 |

(Continued)

FOREIGN PATENT DOCUMENTS

JP        10206555 A * 8/1998

*Primary Examiner* — Mary E McManmon
*Assistant Examiner* — David Colon-Morales (57) ABSTRACT

An earthquake gas valve that uses a battery powered actuation mechanism to automatically close a gas valve when the movement caused by an earthquake is perceived. A gear motor is activated by a plurality of shake switches which in turn cause a motor driven radial rack to rotate. The rack terminates in a closure plug which obstructs the gas outlet opening and prevents gas from entering the house or office when an earthquake occurs. A timing circuit delays the activation of the closure plug to make sure that the motion has been caused by an earthquake and not by an accidental brief jarring action.

1 Claim, 10 Drawing Sheets

(56) References Cited

U.S. PATENT DOCUMENTS

| | | | | |
|---|---|---|---|---|
| 4,792,116 A * | 12/1988 | Huber, Jr. | ............... | F16K 1/24 |
| | | | | 137/375 |
| 4,817,657 A * | 4/1989 | Kovacs | ............... | F16K 17/36 |
| | | | | 137/38 |
| 4,911,029 A * | 3/1990 | Banba | ............... | F16K 17/363 |
| | | | | 137/38 |
| 4,915,122 A * | 4/1990 | Ikegaya | ............... | F16K 17/363 |
| | | | | 137/38 |
| 5,209,454 A * | 5/1993 | Engdahl | ............... | F16K 17/363 |
| | | | | 137/38 |
| 5,618,027 A * | 4/1997 | Nevrekar | ............... | F16K 13/02 |
| | | | | 251/250.5 |
| 5,787,917 A * | 8/1998 | Park | ............... | F16K 17/36 |
| | | | | 137/38 |
| 5,960,807 A * | 10/1999 | Reyman | ............... | F16K 17/36 |
| | | | | 137/1 |
| 6,085,772 A * | 7/2000 | McGill | ............... | F16K 17/366 |
| | | | | 137/39 |
| 6,112,764 A * | 9/2000 | Engdahl | ............... | F16K 17/36 |
| | | | | 137/38 |
| 6,199,573 B1 * | 3/2001 | Paskiewicz | ............... | F17D 5/00 |
| | | | | 137/357 |
| 6,311,714 B1 * | 11/2001 | Watanabe | ............... | F16K 17/36 |
| | | | | 137/38 |
| 6,374,850 B1 * | 4/2002 | Timm | ............... | A62C 2/04 |
| | | | | 137/39 |
| 6,414,601 B1 * | 7/2002 | Massedonio | ............... | G08B 21/10 |
| | | | | 340/690 |
| 6,860,288 B2 * | 3/2005 | Uhler | ............... | F17D 5/06 |
| | | | | 137/312 |
| 7,458,387 B2 * | 12/2008 | McGill | ............... | F16K 3/0209 |
| | | | | 137/15.03 |
| 8,567,757 B2 * | 10/2013 | Pitchford | ............... | F16K 31/086 |
| | | | | 137/39 |
| 8,766,118 B2 * | 7/2014 | Johnstone | ............... | F16K 17/36 |
| | | | | 137/43 |
| 8,857,459 B2 * | 10/2014 | Penwell | ............... | F16K 17/36 |
| | | | | 137/39 |
| 9,080,680 B2 * | 7/2015 | Minato | ............... | F16K 17/366 |
| 9,121,520 B2 * | 9/2015 | Lin | ............... | F16K 17/36 |
| 9,377,121 B2 * | 6/2016 | Burgess | ............... | F16K 31/041 |
| 9,601,947 B2 * | 3/2017 | Ogden | ............... | F17D 5/00 |
| 10,215,301 B2 * | 2/2019 | Kwasniewski | ............... | F16K 31/535 |
| 2001/0035510 A1 * | 11/2001 | Oh | ............... | F16K 31/535 |
| | | | | 251/129.03 |
| 2012/0325197 A1 * | 12/2012 | Legaspi | ............... | F23N 5/242 |
| | | | | 126/42 |
| 2014/0264111 A1 * | 9/2014 | Porter | ............... | F16K 17/36 |
| | | | | 251/129.03 |
| 2014/0346380 A1 * | 11/2014 | Bourqui | ............... | F16K 31/041 |
| | | | | 251/129.11 |
| 2015/0048269 A1 * | 2/2015 | Shao | ............... | F16K 31/047 |
| | | | | 251/129.11 |

\* cited by examiner

EARTHQUAKE GAS VALVE

CROSS-RELATED APPLICATION

This application claims the benefit of U.S. Provisional Pat. App. No. 62/603,179 filed on May 19, 2017, the entirety of which is incorporated herein by reference.

TECHNICAL BACKGROUND

Technical Field

This disclosure relates generally to the field of gas valves and more specifically to gas valve that automatically shuts off when an earthquake occurs.

Background Information

Earthquakes can occur in any land mass that is close to a tectonic plate located under the surface of the earth. Earthquakes can do extensive damage due to the sometimes-violent shaking motion that is precipitated by the slippage of one tectonic plate over another tectonic plate. Many homes and offices are heated by natural gas. Some homes and offices also have stove tops that also use natural gas to cook food. If a gas line is ruptured during an earthquake, there is a possibility that an explosion can occur which could do serious damage to a structure such as a home or office.

In an effort to automatically shut off gas when an earthquake occurs, a mechanical earthquake valve has been developed and marketed. The basic operating premise of the valve is that a sphere, or other physical object is caused to fall off a pedestal within a valve body. The sphere rolls down via gravity to then obstruct the gas inlet port of the valve, thereby preventing gas from entering a house or office and preventing the possible explosion that might occur when a gas line ruptures due to the violent shaking of an earthquake. This type of valve can save lives and has even been mandated by some state legislatures.

However, there are deficiencies in the prior technology. Mechanical type earthquake valves can be accidentally activated if the valve body is bumped into, or if a large truck rumbles down the street and causes enough shaking to dislodge the ball sitting on its pedestal, causing it to roll down and shut off the gas. Generally, it requires calling the local utility company to have someone come to the residence or office location to re-set the valve to the open position. Additionally, mechanical earthquake valves cannot be shut off or on remotely. Also, a mechanical valve cannot be activated by other adverse conditions such as extreme heat from a fire.

BRIEF SUMMARY OF THE INVENTION

An earthquake gas valve that uses an electro-mechanical battery powered actuation method to automatically close a gas valve when the movement caused by an earthquake is perceived, or if an extremely high temperature is perceived. A gear motor is activated by a plurality of shake switches which in turn cause a motor driven radial rack to rotate. The rack terminates in a closure plug which obstructs the gas outlet opening and prevents gas from entering the house or office when an earthquake occurs. A timing circuit delays the activation of the closure plug to make sure that the motion has been caused by an earthquake and not by an accidental brief jarring action. In one embodiment, the closure mechanism can be activated remotely by receiving a transmitted signal which is picked up by a receiving device within the valve enclosure, or the valve can send a signal to a central remote location telling of its open or closed condition.

There is disclosed herein an earthquake gas valve comprising: a main housing, a housing top cover, a pair of housing clamps, a rack member gasket, a housing gasket, a radial rack member, a gear motor, a battery, a drive gear, a gas closure member, a linkage arm, a separator plate, a printed circuit board, a plurality of shake switches, a microprocessor, said housing top cover attached to said main housing via said housing clamps, said housing gasket sealing said housing top cover to said main housing sealed in an airtight manner, said separator plate isolating the lower gas flow area from the upper electromechanical storage area, said radial rack member extending from said upper housing area to said lower housing area and through said rack member gasket, said drive gear attached to the shaft of said gear motor, said drive gear engaging said radial rack, said radial rack terminating at one end in said gas closure member, said closure member being made of a resilient material, said linkage arm attached to said radial rack member and pinned to a fulcrum hinge point located under said separator plate, said main housing including one or more gas inlet apertures and one gas outlet aperture, said battery capable of powering said gear motor, said gear motor caused to rotate when said shake switches sense physical movement and turn on said motor causing said gas closure member to fully obstruct said gas inlet aperture, said microprocessor including a timing circuit that delays the activation of said gear motor for a pre-determined period of time to insure that the movement is being generated by an earthquake and not by an accidental brief motion occurrence.

BRIEF DESCRIPTION OF THE DRAWINGS

The drawings constitute a part of this specification and include exemplary embodiments of an earthquake gas valve, it is to be understood that in some instances various aspects of the earthquake gas valve may be shown exaggerated or enlarged to facilitate an understanding of the disclosure.

DETAILED DESCRIPTION OF THE DRAWINGS

Detailed descriptions of embodiments of an earthquake gas valve are provided herein. Therefore, specific details disclosed herein are not to be interpreted as limiting, but rather as a basis for the claims and as a representative basis for teaching one skilled in the art to employ the present invention in virtually any appropriately detailed system, structure or manner.

Figure 1:
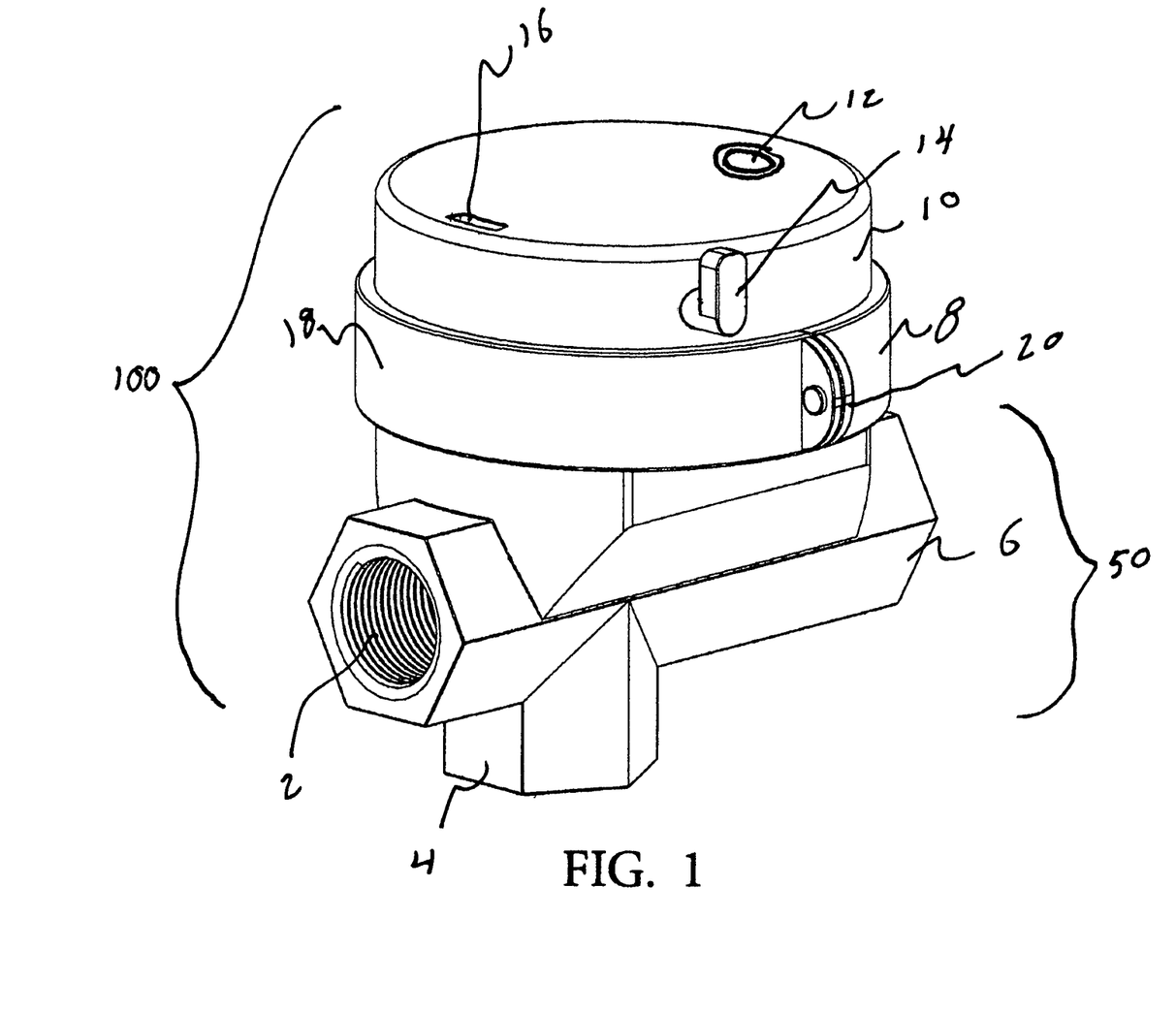
FIG. 1 is a perspective view of an earthquake gas valve.

Referring now to FIG. 1 we see a perspective view of an earthquake gas valve 100, comprised of a main housing 50, that includes two gas inlet ports 2, 4 and one gas outlet port 6 which supplies gas to a home or office, and an upper electromechanical storage area comprised of the space enclosed by the main housing 50 and a housing top cover 10. The housing top cover 10 is retained by housing clamps 8, 18 that are held in place by rivets 20. A window 16 in the housing top cover 10 allows the user to see whether the valve is in the open or closed position as will be explained below. An electric push switch 12 allows the user to electrically open or close the valve 100. This feature is optional and somewhat redundant because mechanical shutoff lever arm 14 allows the user to mechanically open or close the valve 100 in the event of an electrical failure. The entire device 100 is relatively compact, water resistant and can be easily installed in existing gas pipe layouts found in homes or offices.

Figure 2:
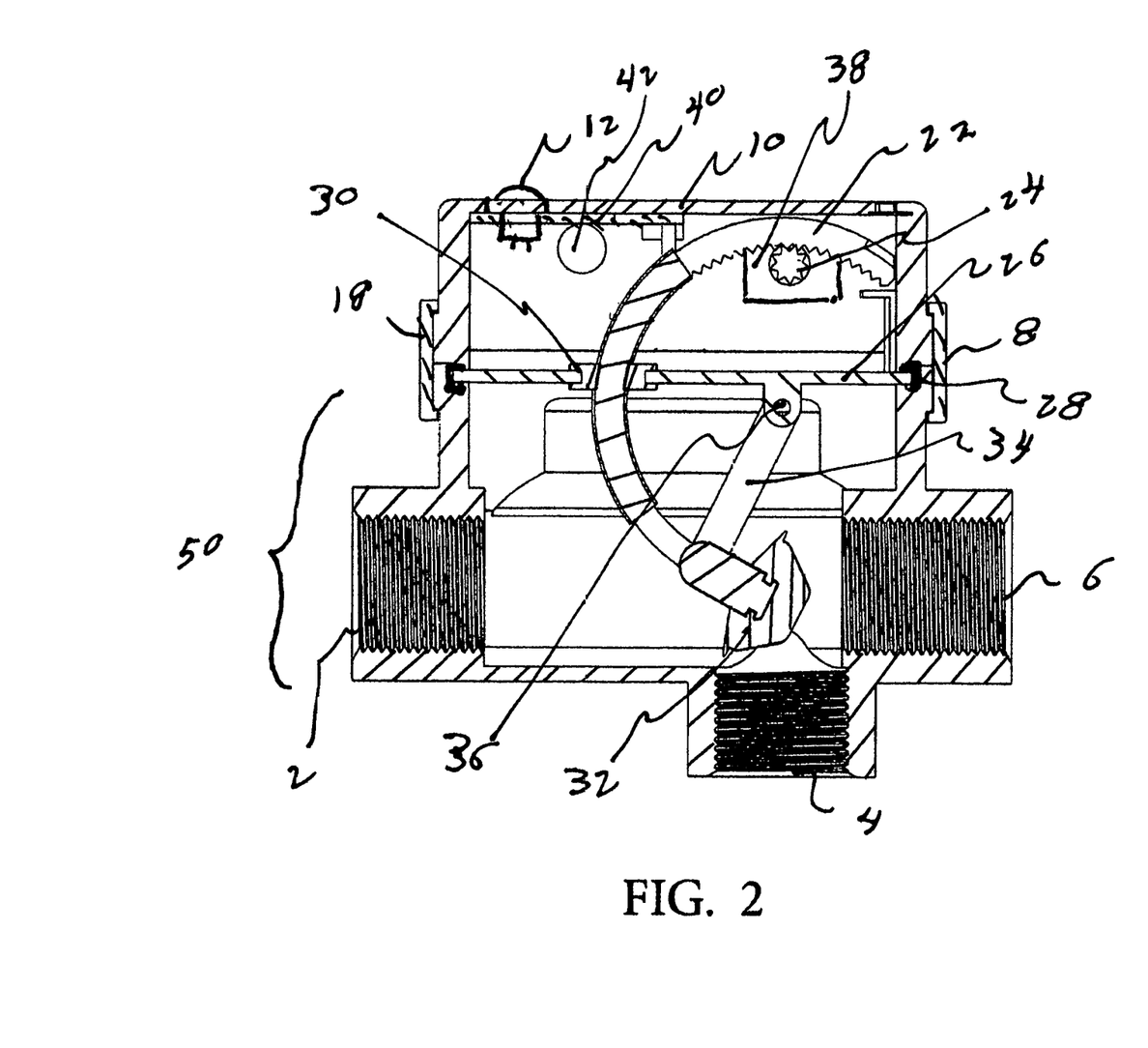
FIG. 2 is a section view that bisects the earthquake gas valve of FIG. 1 showing a closure plug in an open position.
Figure 4:
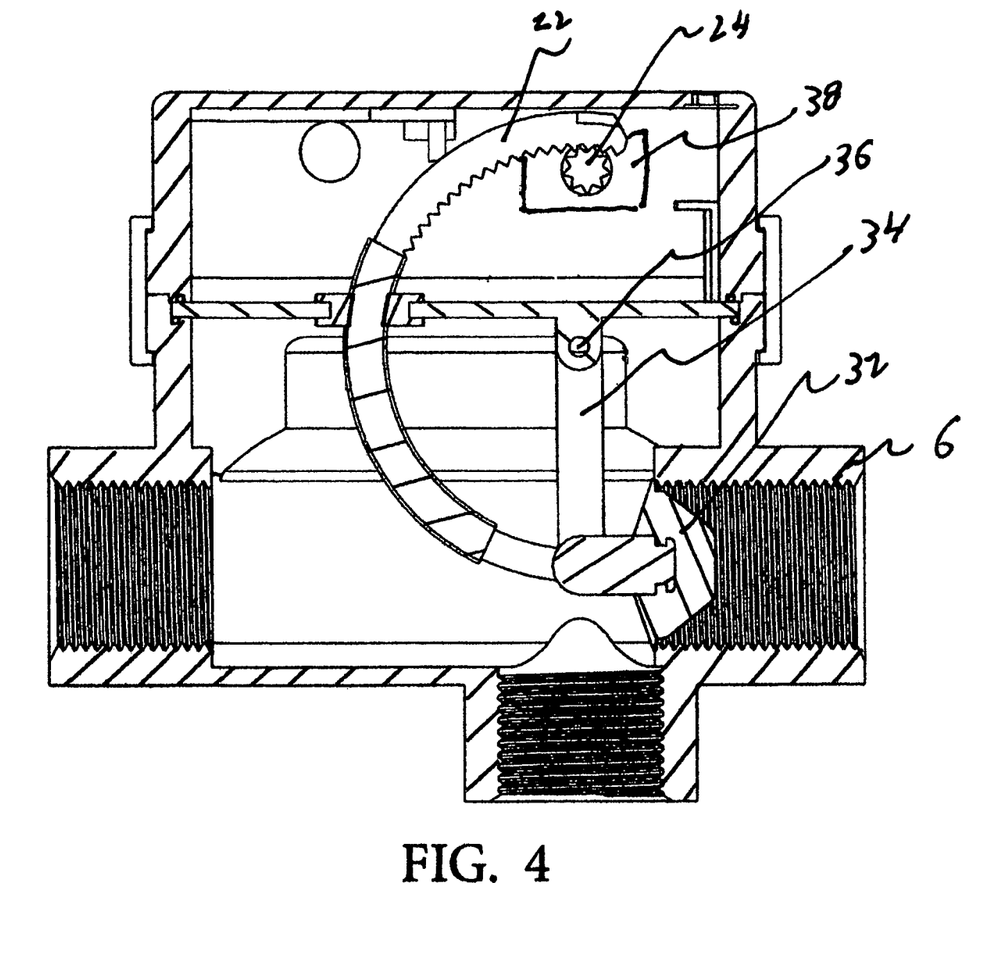
FIG. 4 is a section view that bisects the earthquake gas valve of FIG. 1 showing the closure pug in a closed position.

FIG. 2 is a side section view of the earthquake gas valve with the gas flow unobstructed by a closure member 32. The closure member 32 is located at the end of a radial rack member 22. The rack member 22 is rotated when a drive gear 24 attached to the shaft of a gear motor 38, when the gear motor 38 is turned on. Rack member 22 rotates about a fulcrum point 36 which connects a linkage arm 34 with the underside of a separator plate 26. The housing top cover 10 and the main housing 50 are separated by the separator plate 26 to prevent gas from entering the upper electromechanical storage area that contains electrical components and a battery 42 thereby minimizing the risk of gas explosion due to contact with a spark that may be generated by electrical components. A housing gasket 28 seals the gap between the plate 26 and the housing top cover 10 making it air tight. A rack member gasket 30 seals the area where the rack member 22 penetrates the separator plate 26 yet still allows the rack 22 to slide rotatably during operation. Gas can enter either an inlet 2 or an inlet 4. Whichever inlet is not used is plugged by a standard threaded plug. A gas outlet port 6 can be either unobstructed by a closure plug 32 as shown, or can be obstructed by the closure plug 32, as shown in FIG. 4. The closure plug 32 can change locations when the rack member 22 is driven forward or backward by the drive gear 24 which is powered by the gear motor 38.

Figure 3:
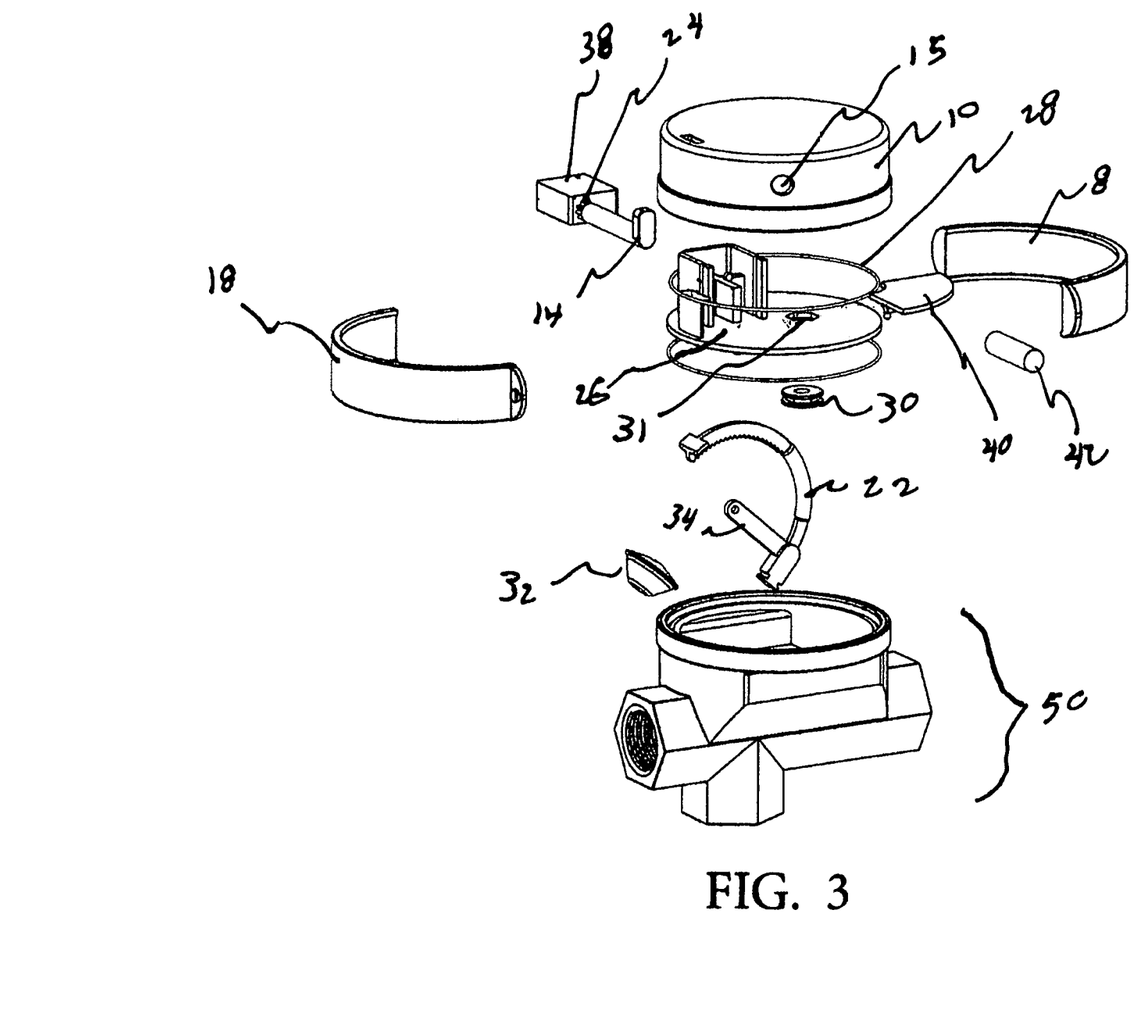
FIG. 3 is an exploded view of the earthquake gas valve of FIG. 1.

FIG. 3 is an exploded view of the earthquake gas valve. A main housing 50 is clearly shown, as is the radial rack 22, the motor 38, the drive gear 24 and the manual valve open, close lever 14. The housing gasket 28 can be seen as well as the rack member gasket 30, which, in embodiments, may be grommet shaped and can be inserted into an aperture 31 in the separator plate 26.

FIG. 4 is a section view showing the perimeter of the resilient closure plug 32 pressed against the perimeter of an outlet port 6, so that the flow of gas to a house or office is totally obstructed.

Figure 5:
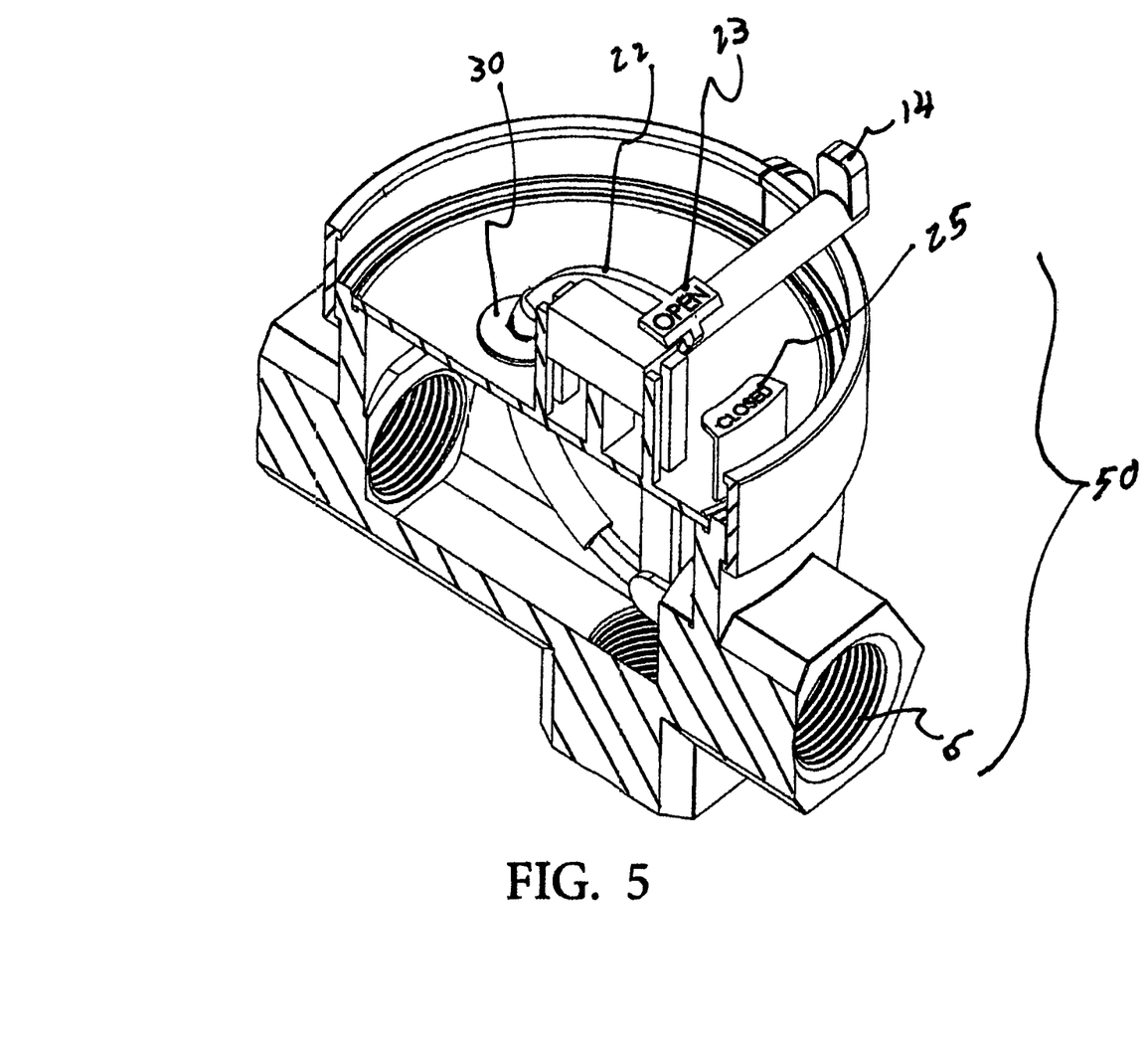
FIG. 5 is a perspective section view showing graphic panels indicating open or closed.
Figure 6:
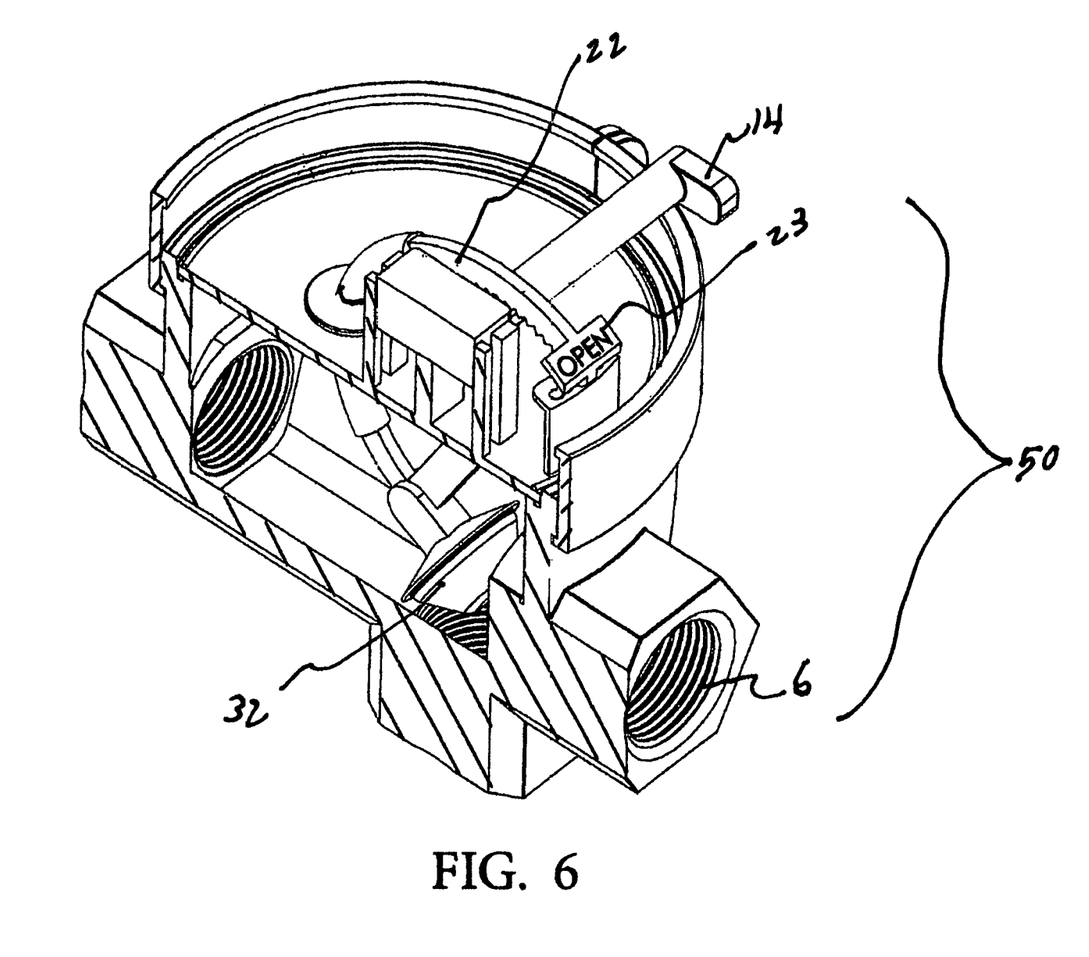
FIG. 6 is a perspective section view showing a graphic panel indicating that the valve is open.
Figure 7:
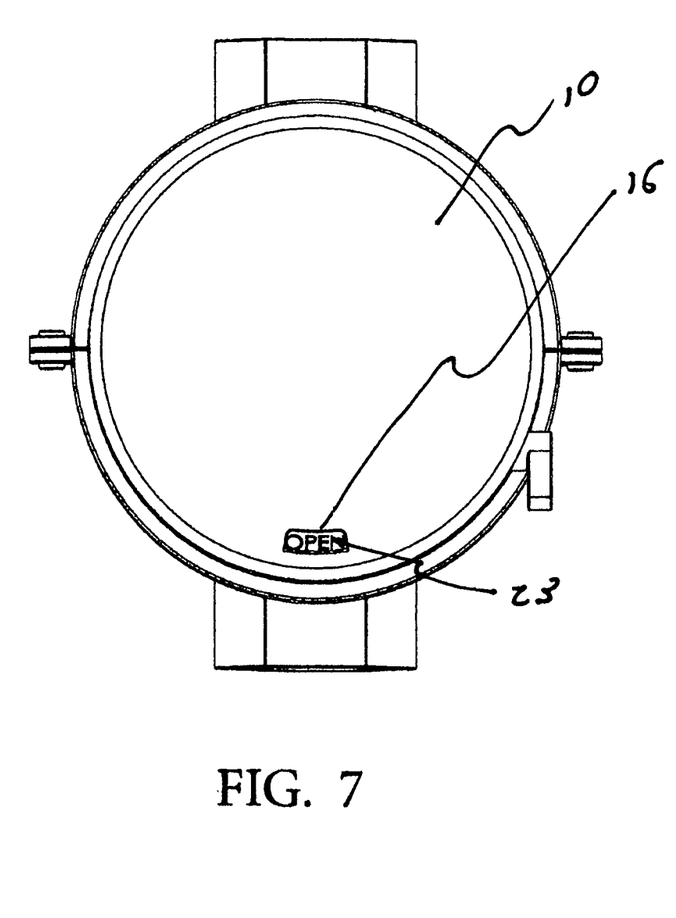
FIG. 7 is a top view of the earthquake gas valve of FIG. 1 where the graphic panel reads "open".
Figure 8:
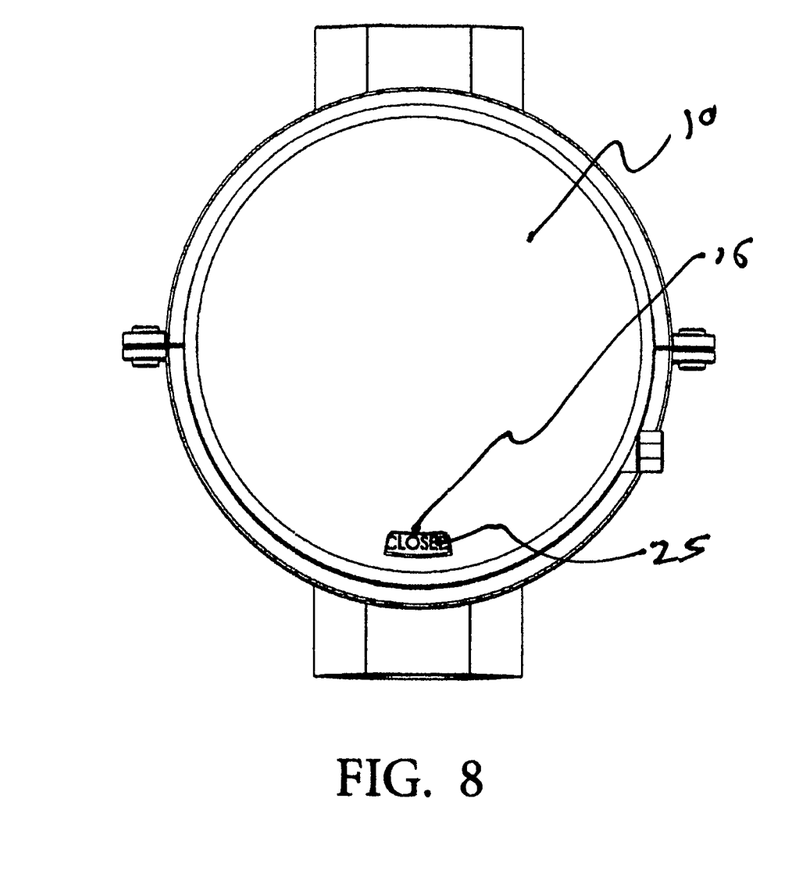
FIG. 8 is a top view of the invention where the graphic panel reads "closed"

FIG. 5 is a perspective view of the main housing 50 which shows that the opposite end of the rack member 22 terminates in a flat plate 23 that includes a graphic which reads "open". A second graphic 25 mounted permanently on a non-moving tab in the housing body 50 reads "closed". In the illustration shown in FIG. 5, the rack and closure plug are in the closed position, so that when a user looks through the aperture 16 as shown in the top view in FIG. 8 the user sees the word "closed" or red in color, meaning that the valve is closed, and gas cannot pass through. When the rack is in the position shown in FIG. 6, the word "open" or green in color is seen in aperture 16, as shown in the top view of the invention in FIG. 7, meaning that gas can freely pass through outlet port 6.

Figure 9:
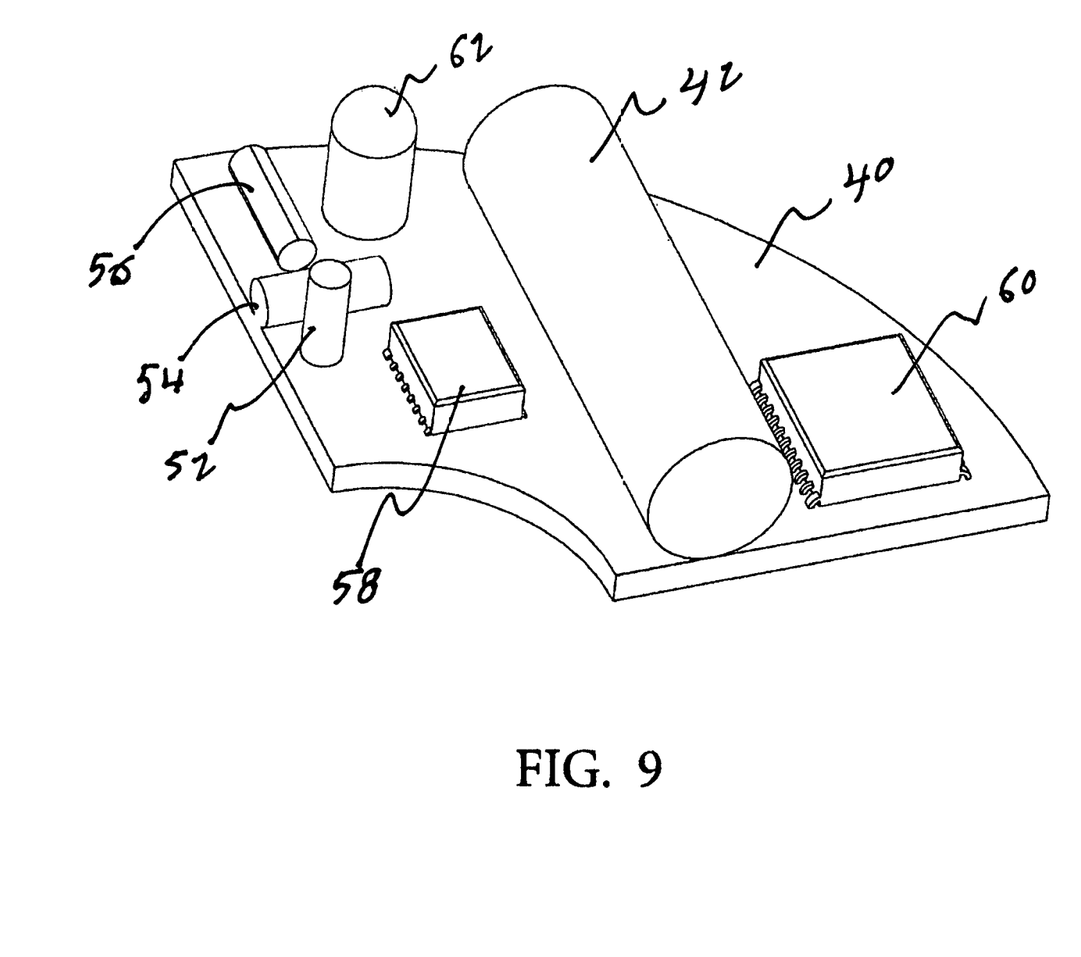
FIG. 9 is a perspective view of the printed circuit board and associated electronics from the earthquake gas valve of FIG. 1.

FIG. 9 is a perspective view of the PC board 40, battery 42 and associated electronics stored within the top housing cover 10 which, in embodiments, may tell the gear motor 38 when to rotate clockwise, and when to rotate counter clockwise to open or close the valve 100. A plurality of shake switches 52, 54, 56 can sense physical motion. The switch 56 senses north and south motion, the switch 54 senses east and west motion. The switch 52 senses up or down motion. When activated, the switches 52, 54, 56 signal microprocessor 58 that physical motion is occurring. The switches may be set to send a signal when a shake of 5.3 or greater is felt on the Richter Scale. The switch settings are a matter of design choice and may be configured to respond to greater or lesser stimuli. The microprocessor 58 may include a timing feature which looks to see that the shake is longer in duration than that of a pre-set time duration programed into microprocessor 58, for example 5 seconds, before sending instructions to motor 38 to turn on. The time duration is also a matter of design choice. This feature eliminates the possibility of false activation due to accidental bumping of the valve, or due to a brief vibration caused by a large truck or the like. Temperature sensor 62 can also activate the valve if an extremely high temperature is sensed such as when a structural fire occurs. Battery 42 can be a lithium polymer type battery that has a shelf life of twenty-five years. Since no power is used except when an earthquake event happens, in embodiments, the battery may remain fresh and usable for twenty-five years.

Figure 10:
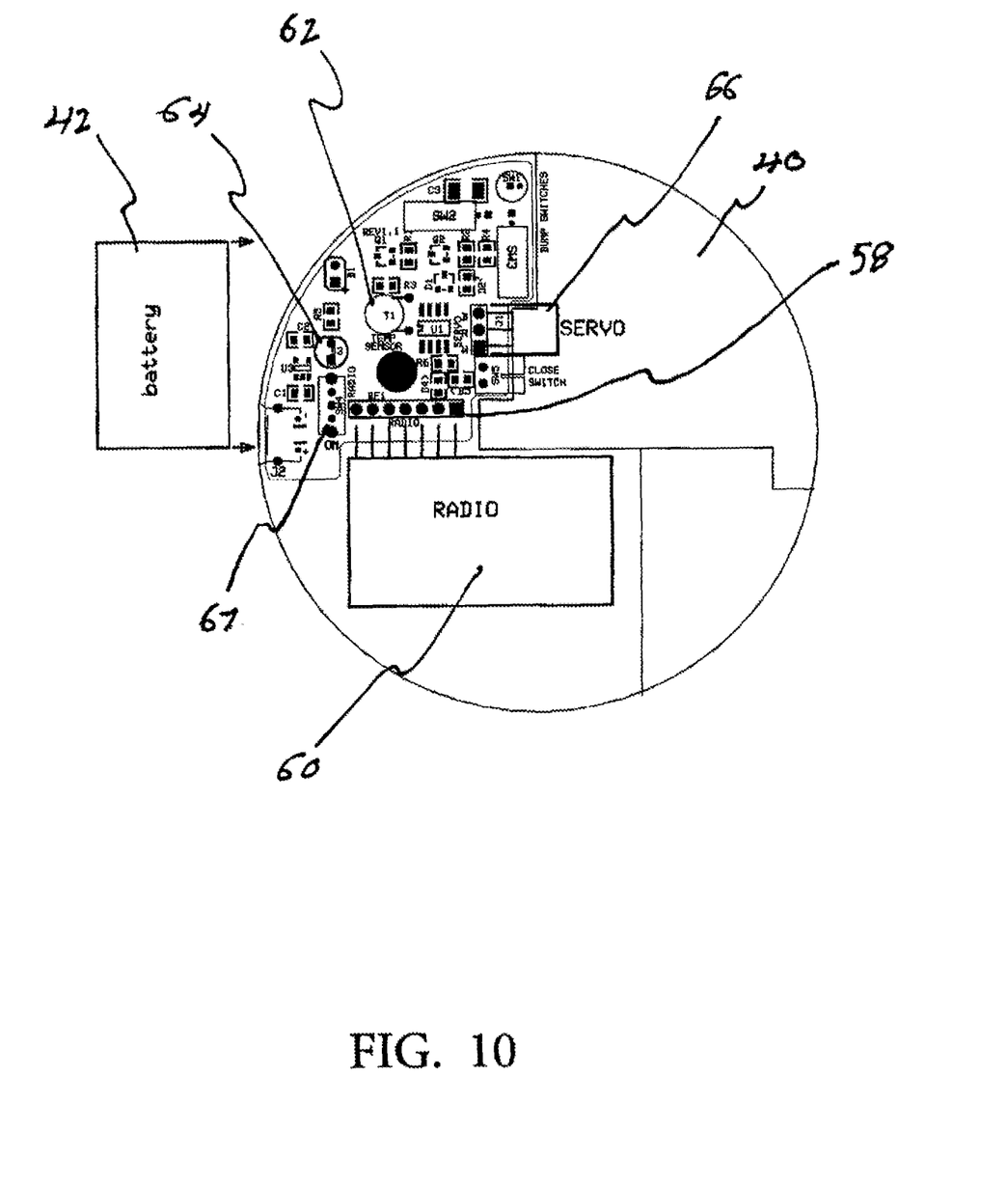
FIG. 10 is a plan view of the printed circuit board for the invention.

FIG. 10 is a plan view of the printed circuit board 40 and outlines of components that are soldered to the board 40 including temperature sensor 62, microprocessor 58, radio on off switch 67, radio transmitter and receiver 60, battery 42 and red LED charging light 64 which indicates that the battery 42 is in charging mode.

In another embodiments, a transmitter and receiver circuit 60 are added so that the valve 100 can be activated remotely, and the valve can also send information to a remote receiving location when necessary. In this type of scenario, the receiver may be awakened periodically to see if a signal is being sent to it. A small amount of electrical power is needed to operate the receiving circuit which tends to reduce the batteries' overall usable life. Therefore, a rechargeable battery can be used which can be recharged via an external charging mechanism as needed.

While the earthquake gas valve has been described in connection with certain embodiments, the description is not intended to limit the scope of the invention to the particular form set forth, but on the contrary, is intended to cover such alternatives, modifications, and equivalents as may be included within the spirit and scope of the device as defined by the appended claims.

What is claimed is:

1. An earthquake gas valve comprising: a main housing, wherein the main housing further comprises a plurality of gas inlet ports, a gas outlet port and a gas closure member; a housing top cover; a pair of housing clamps; a rack member gasket; a housing gasket; a radial rack member having a first end and a second end; a linkage arm; a separator plate; a fulcrum point; wherein the housing top cover is attached to the main housing with the pair of housing clamps; an upper electromechanical storage area comprised of the space enclosed by the housing top cover and the separator plate wherein the upper electromechanical storage area comprises: a battery, a gear motor comprising: a shaft and a drive gear, a printed circuit board, a plurality of shake switches, a microprocessor; wherein the separator plate isolates the main housing from the upper electromechanical storage area; wherein the main housing is airtightly sealed by the housing gasket; wherein the first end of the radial rack member ends in the upper electromechanical storage area and the second end of the radial rack member ends in the main housing passing through the rack member gasket terminating on the gas closure member; wherein the drive gear is attached to the shaft of the gear motor; wherein the drive gear is engaged with the radial rack member; wherein the gas closure member is made of a resilient material; wherein the linkage arm is attached to the radial rack member and is pinned to the fulcrum point located under the separator plate; wherein the battery is sized to power the gear motor; wherein the physical movement of the earthquake gas valve causes the shake switches to energize the gear motor, wherein the energized gear motor rotates the shaft, wherein the shaft rotation rotates the drive gear causing the radial rack member to move the gas closure member to fully obstruct the gas outlet port; and wherein the microprocessor comprises a timing circuit that delays the activation of the gear motor for a pre-determined period of time to ensure that the earthquake gas valve movement is being generated by an earthquake and not by an accidental brief motion occurrence.

\* \* \* \* \*